Dec. 7, 1948.                F. WAGNER                 2,455,538
                    METHOD OF MAKING CUTTING TOOLS
                         Filed Jan. 8, 1945
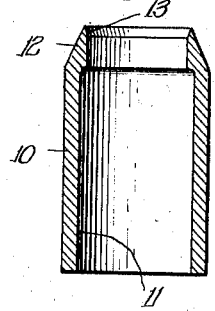
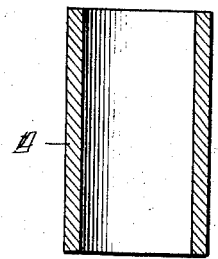 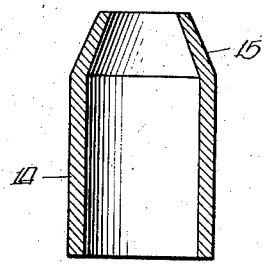 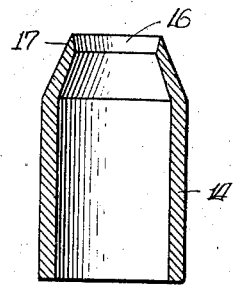
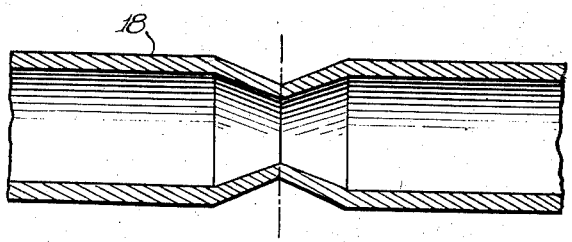
INVENTOR.
Frank Wagner,
BY
Cromwell, Greist + Warden
attys Patented Dec. 7, 1948

2,455,538

UNITED STATES PATENT OFFICE 2,455,538

METHOD OF MAKING CUTTING TOOLS

Frank Wagner, Chicago, Ill., assignor to J. F. Helmold & Bro., Inc., Chicago, Ill., a corporation of Illinois Application January 8, 1945, Serial No. 571,877

3 Claims. (Cl. 76—101)

The present invention relates to an improved method of producing a die of the type used in punching and related or similar operations.

It is an object of the invention to provide a die and method of the type described whereby the cost of production of the die is substantially lessened by comparison with present procedures.

A further object is to provide a method for producing punching dies, rotary drills, and similar cutters, which is capable of being performed more quickly and easily with a well known type of apparatus and which results in a tool having improved cutting efficiency.

A still further object is to provide a method of forming a die or like cutter, which, except for the sharpening of the cutting edge thereof, involves only a simple spinning operation on a plain tubular element, with resultant high speed and economy of production.

In the drawings,

Fig. 1 is a view in elevation illustrating a die or similar cutter produced in accordance with existing methods, which is the purpose of the present invention to supersede;

Figs. 2, 3 and 4 are similar views in vertical transverse section, illustrating successive steps in the production of a die or similar cutting element in accordance with the provision of the present invention; and Fig. 5 is a view illustrating a modified method of performing a step in the method.

In the production of conventional dies, punches or like tools, such as I have illustrated in Fig. 1 and designated by the reference numeral 10, it is customary to operate on a tubular sleeve-like blank of predetermined radial wall thickness by first counterboring said tubular element from the rear thereof at 11 so as to provide a sufficiently great rearward clearance area of cross section to enable ready discharge of chips of board or paper, cardboard, and the like, cut by the tool. The thus counterbored tube is then finished by grinding an outer cutting surface 12 and an inner cutting surface 13 at the front end or nose thereof. Needless to say, the operation of removing metal at counterbore 11 preliminary to the grinding of the cutting edge makes the production of the die or cutter a relatively time-consuming one, since the work is ordinarily removed from the chuck or other holder and reversed intermediate the two steps. In any event the counterboring operation represents a distinct expenditure of time, which it is the purpose of this invention to eliminate.

In addition to the fact that by the present method I substantially reduce the time required for the formation of a die, by entirely eliminating the aforesaid counterboring step and by substituting a simple spinning operation, I have found that said spinning operation improves the functioning of the completed die in a manner to be discussed.

Referring to Figs. 2, 3 and 4, the reference numeral 14 designates a suitable tubular blank or body for the die to be produced, which may be in the form of a length of seamless mild steel tubing of, for example, SAE 1015 analysis. Alternatively, if desired, this tube may be fabricated of a higher carbon content steel or of an alloy steel of suitable composition, or of other suitable material, depending upon the type of cutting for which the finished die is to be employed and the limitations of the further procedures to be described.

As a first step in the process, the tubular element 14 is set up in a suitable apparatus and subjected to a spinning operation in which the nose thereof is spun over at 15 to frusto-conical section, as illustrated in Fig. 3, with the inner and outer diameters at said nose reduced somewhat. Of course, the inherent limitations of the spinning procedure will impose some restriction on the type and hardness of metal which can be employed in the cutter. However, I have had excellent results with the SAE 1015 steel of which mention is made above. These matters are readily determinable with the knowledge of physical properties of metals by those skilled in the art. The fact to be noted is that the spinning operation provides a cutting circumference at the nose of the blank which is sufficiently reduced in diameter, compared to the normal diameter of the tubular die blank rearwardly thereof, to provide adequate clearance for chips, waste, etc., and that this is accomplished without counterboring or removal of material.

As the next step, the inner surface of the nose 15 is ground at 16 and the outer surface is appropriately ground at 17 to define the circumferential sharpened knife edge necessary for the die punching operation for which the cutter is to be employed. It may be observed at this point that a cutter produced in accordance with the above procedure appears to be somewhat compacted or hardened at the cutting nose 15, as by refinement of the grain structure by cold working or a work hardened toughening of the metal. As to the exact scientific nature of the phenomenon, I make no attempt to explain the same but only observe that it appears to exist. The tool seems to acquire improved cutting properties in the finished form, which may be attributable to a work hardening phenomenon. I am aware that this phenomenon is pronounced in certain types of steels, for example, alloy steels of the stainless variety, and desire to point out that the pressure and kneading action attending the spinning operation which I have described, when coupled with subsequent grinding to form knife edges 16, 17, may well be the basis of the improved cutting action which I have observed.

In any event and whatever the reasons underlying the improved operating characteristic of the tool, the method of producing the same by simply spinning a plain tubular blank and sharpening results in a substantial economy of time and resultant decrease in cost, while producing the necessary rear clearance for free passage and expulsion of the chips, disks or plugs which are punched from sheet stock in the use of the cutter.

As a final operation, the sharpened cutter is suitably treated, if the circumstances of choice of metal for the cutter and for its intended use so indicate, as by a cyanide bath hardening operation, to provide a further hardened outer skin adjacent the cutting edge which will render the same more resistant to breakage or chipping at that point.

In Fig. 5 I have illustrated an extension of the foregoing process, wherein the spinning operation for two different dies may be performed at one time. In this embodiment the blank 18 is twice the normal length and the spinning operation is performed at the middle thereof to constrict the blank at that point. Following this the tubular blank is cut in two at the medial constricted portion, and the noses on each of the resultant spun elements are sharpened and heat treated in the manner described above.

In the above description I have referred primarily to the production of a die or punch. However, it will be appreciated by those skilled in the art that the manufacturing steps are equally applicable to the production of rotary paper drills and the like, or in fact to any type cutter to which the spinning operation primarily characterizing the novel method is applicable.

I claim:
1. The method of making a cutting tool of hollow tubular cross-section, comprising spinning a hollow tube to constrict the same radially at a predetermined section intermediate the ends of the tube, which section is substantially coincident with the cutting extremity of the finished tool, and thereby to reduce the inner circumference of said section compared to the inner circumference of the remainder of the tube and to harden the material of the tube at the nose section, transversely subdividing the tube at said section to produce a pair of similar blanks each having a nose section of internally and externally reduced diameter, and sharpening the portion only of said constricted nose section which immediately adjoins the cutting extremity to define a circumferential cutting edge adjoined rearwardly by a further unsharpened portion of said constricted nose section.

2. The method of making a cutting tool of hollow tubular cross section, comprising radially constricting a hollow cylindrical tube at a predetermined nose section substantially coincident with the intended cutting extremity of the tool by spinning said tube sufficiently to substantially reduce the inner circumference of said nose section as compared to the normal inner circumference of the remainder of the tube, internally sharpening the portion of said restricted nose section which immediately adjoins the cutting extremity, thereby to define an annular cutting edge, and terminating said internal sharpening of said internally reduced nose section at a zone rearwardly adjoining said sharpened portion and disposed inwardly of said normal inner tube circumference.

3. The method of making a cutting tool of hollow tubular cross section, comprising radially constricting a hollow cylindrical tube at a predetermined nose section substantially coincident with the intended cutting extremity of the tool by spinning said tube sufficiently to substantially reduce the inner circumference of said nose section as compared to the normal inner circumference of the remainder of the tube, internally sharpening the portion of said restricted nose section which immediately adjoins the cutting extremity, thereby to define an annular cutting edge, terminating said internal sharpening of said internally reduced nose section at a zone rearwardly adjoining said sharpened portion and disposed inwardly of said normal inner tube circumference, and heat treating said tool to improve the cutting quality of said edge.

FRANK WAGNER.

REFERENCES CITED

The following references are of record in the file of this patent:

UNITED STATES PATENTS

| Number | Name | Date |
|---|---|---|
| 508,694 | Fuller | Nov. 14, 1893 |
| 801,358 | Casey | Oct. 10, 1905 |
| 849,329 | Colthar | Apr. 2, 1907 |
| 1,096,009 | Ayres | May 12, 1914 |
| 1,325,073 | Boyd et al. | Dec. 16, 1919 |
| 1,533,236 | Dawson | Apr. 14, 1925 |
| 1,713,076 | Englund | May 14, 1929 |
| 1,731,715 | Dunlap | Oct. 15, 1929 |
| 1,915,657 | Findlater | June 27, 1933 |
| 1,999,324 | Esser | Apr. 30, 1935 |
| 2,066,372 | Tomalis | Jan. 5, 1937 |
| 2,141,492 | Southwick | Dec. 27, 1938 |
| 2,160,866 | Hothersall | June 6, 1939 |
| 2,175,139 | Wilkie | Oct. 3, 1939 |
| 2,187,651 | Jackson | Jan. 16, 1940 |